(12) United States Patent
Gieseke et al.

(10) Patent No.: US 10,086,870 B2
(45) Date of Patent: Oct. 2, 2018

(54) TRAILER PARKING ASSIST SYSTEM FOR VEHICLE

(71) Applicant: MAGNA ELECTRONICS INC., Auburn Hills, MI (US)

(72) Inventors: Achim Gieseke, Gross-Umstadt (DE); Ralph Latotzki, Hamburg (DE); Ruediger Boegel, Bessenbach-Keilberg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 17 days.

(21) Appl. No.: 15/238,005

(22) Filed: Aug. 16, 2016

(65) Prior Publication Data
US 2017/0050672 A1 Feb. 23, 2017

Related U.S. Application Data

(60) Provisional application No. 62/206,443, filed on Aug. 18, 2015.

(51) Int. Cl.
| | |
|---|---|
| *B62D 13/06* | (2006.01) |
| *B60R 1/00* | (2006.01) |
| *B62D 15/02* | (2006.01) |
| *B60W 30/09* | (2012.01) |

(52) U.S. Cl.
CPC ............ *B62D 13/06* (2013.01); *B60R 1/00* (2013.01); *B60W 30/09* (2013.01); *B62D 15/0295* (2013.01); *B60R 2300/806* (2013.01); *B60R 2300/8086* (2013.01); *B60R 2300/8093* (2013.01)

(58) Field of Classification Search
CPC ............ B60R 2300/806; B60R 1/00; B60R 2300/8093; B60R 2300/8086; B62D 13/06; B62D 15/0295; B60W 30/09
USPC .......................................................... 701/48
See application file for complete search history.

(56) References Cited

U.S. PATENT DOCUMENTS

| | | |
|---|---|---|
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,208,701 A | 5/1993 | Maeda |
| 5,245,422 A | 9/1993 | Borcherts et al. |
| 5,276,389 A | 1/1994 | Levers |

(Continued)

*Primary Examiner* — Atul Trivedi
(74) *Attorney, Agent, or Firm* — Honigman Miller Schwartz and Cohn, LLP

(57) ABSTRACT

A driver assist system for a vehicle includes a plurality of vehicle cameras and at least one trailer camera, with the vehicle cameras configured to be disposed at a vehicle and having respective fields of view exterior of the vehicle and the trailer camera configured to be disposed at a trailer towed by the vehicle. An image processor is operable to process image data captured by the vehicle cameras and the trailer camera. Responsive to processing of captured image data during forward or rearward motion of the vehicle and trailer, the image processor is operable to calibrate the trailer camera with the vehicle cameras. Responsive to processing of captured image data during forward or rearward motion of the vehicle and trailer, the image processor is operable to determine objects rearward of the trailer that are not in the fields of view of the vehicle cameras.

17 Claims, 4 Drawing Sheets

(56) References Cited

U.S. PATENT DOCUMENTS

| | | |
|---|---|---|
| 5,289,182 A | 2/1994 | Brillard et al. |
| 5,305,012 A | 4/1994 | Faris |
| 5,307,136 A | 4/1994 | Saneyoshi et al. |
| 5,309,137 A | 5/1994 | Kajiwara |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,420 A | 6/1996 | Tsuchiya et al. |
| 5,535,314 A | 7/1996 | Alves et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,940,120 A | 8/1999 | Frankhouse et al. |
| 5,949,331 A | 9/1999 | Schofield et al. |
| 5,956,181 A | 9/1999 | Lin |
| 5,959,555 A | 9/1999 | Furuta |
| 5,963,247 A | 10/1999 | Banitt |
| 5,964,822 A | 10/1999 | Alland et al. |
| 5,990,649 A | 11/1999 | Nagao et al. |
| 6,009,336 A | 12/1999 | Harris et al. |
| 6,020,704 A | 2/2000 | Buschur |
| 6,084,519 A | 7/2000 | Coulling et al. |
| 6,116,743 A | 9/2000 | Hoek |
| 6,144,022 A | 11/2000 | Tenenbaum et al. |
| 6,175,300 B1 | 1/2001 | Kendrick |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,411,204 B1 | 6/2002 | Bloomfield et al. |
| 6,411,328 B1 | 6/2002 | Franke et al. |
| 6,424,273 B1 | 7/2002 | Gutta et al. |
| 6,430,303 B1 | 8/2002 | Naoi et al. |
| 6,433,817 B1 | 8/2002 | Guerra |
| 6,442,465 B2 | 8/2002 | Breed et al. |
| 6,480,104 B1 | 11/2002 | Wall et al. |
| 6,483,429 B1 | 11/2002 | Yasui et al. |
| 6,497,503 B1 | 12/2002 | Dassanayake et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,761 B1 | 5/2003 | Miller et al. |
| 6,574,033 B1 | 6/2003 | Chui et al. |
| 6,578,017 B1 | 6/2003 | Ebersole et al. |
| 6,589,625 B1 | 7/2003 | Kothari et al. |
| 6,594,583 B2 | 7/2003 | Ogura et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,721,659 B2 | 4/2004 | Stopczynski |
| 6,735,506 B2 | 5/2004 | Breed et al. |
| 6,744,353 B2 | 6/2004 | Sjönell |
| 6,762,867 B2 | 7/2004 | Lippert et al. |
| 6,795,221 B1 | 9/2004 | Urey |
| 6,823,241 B2 | 11/2004 | Shirato et al. |
| 6,909,753 B2 | 6/2005 | Meehan et al. |
| 6,975,775 B2 | 12/2005 | Rykowski et al. |
| 7,062,300 B1 | 6/2006 | Kim |
| 7,065,432 B2 | 6/2006 | Moisel et al. |
| 7,085,637 B2 | 8/2006 | Breed et al. |

(56) References Cited

U.S. PATENT DOCUMENTS

| | | |
|---|---|---|
| 7,092,548 B2 | 8/2006 | Laumeyer et al. |
| 7,116,246 B2 | 10/2006 | Winter et al. |
| 7,133,661 B2 | 11/2006 | Hatae et al. |
| 7,158,015 B2 | 1/2007 | Rao et al. |
| 7,202,776 B2 | 4/2007 | Breed |
| 7,227,611 B2 | 6/2007 | Hull et al. |
| 7,375,803 B1 | 5/2008 | Bamji |
| 7,483,058 B1 | 1/2009 | Frank et al. |
| 7,541,743 B2 | 6/2009 | Salmeen et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,690,737 B2 | 4/2010 | Lu |
| 7,843,451 B2 | 11/2010 | Lafon |
| 7,855,778 B2 | 12/2010 | Yung et al. |
| 7,881,496 B2 | 2/2011 | Camilleri |
| 7,930,160 B1 | 4/2011 | Hosagrahara et al. |
| 8,010,252 B2 | 8/2011 | Getman et al. |
| 8,017,898 B2 | 9/2011 | Lu et al. |
| 8,063,752 B2 | 11/2011 | Oleg |
| 8,094,170 B2 | 1/2012 | Kato et al. |
| 8,164,628 B2 | 4/2012 | Stein et al. |
| 8,218,007 B2 | 7/2012 | Lee et al. |
| 8,224,031 B2 | 7/2012 | Saito |
| 8,260,518 B2 | 9/2012 | Englert et al. |
| 8,411,998 B2 | 4/2013 | Huggett et al. |
| 9,085,261 B2 | 7/2015 | Lu et al. |
| 9,233,645 B2 * | 1/2016 | Schofield ............... B60C 23/00 |
| 9,495,876 B2 | 11/2016 | Lu et al. |
| 9,631,936 B2 * | 4/2017 | Shashua ................ G01C 21/32 |
| 9,637,053 B2 * | 5/2017 | Schofield ............... B60R 1/025 |
| 9,708,000 B2 * | 7/2017 | Hafner ................... B62D 13/06 |
| 9,802,542 B2 * | 10/2017 | Lu .......................... B60R 1/002 |
| 9,969,428 B2 * | 5/2018 | Hafner ................... B62D 13/06 |
| 2001/0001563 A1 | 5/2001 | Tomaszewski |
| 2002/0113873 A1 | 8/2002 | Williams |
| 2003/0137586 A1 | 7/2003 | Lewellen |
| 2003/0222982 A1 | 12/2003 | Hamdan et al. |
| 2005/0237385 A1 | 10/2005 | Kosaka et al. |
| 2006/0103727 A1 | 5/2006 | Tseng |
| 2006/0250501 A1 | 11/2006 | Wildmann et al. |
| 2007/0104476 A1 | 5/2007 | Yasutomi et al. |
| 2007/0242339 A1 | 10/2007 | Bradley |
| 2008/0147321 A1 | 6/2008 | Howard et al. |
| 2008/0231701 A1 | 9/2008 | Greenwood et al. |
| 2009/0113509 A1 | 4/2009 | Tseng et al. |
| 2009/0143967 A1 | 6/2009 | Lee et al. |
| 2012/0045112 A1 | 2/2012 | Lundblad et al. |
| 2012/0265416 A1 | 10/2012 | Lu et al. |
| 2013/0231825 A1 * | 9/2013 | Chundrlik, Jr. ... B60W 50/0098 701/29.1 |
| 2014/0052337 A1 * | 2/2014 | Lavoie .................. B62D 13/06 701/41 |
| 2014/0058655 A1 * | 2/2014 | Trombley ................ B60R 1/00 701/300 |
| 2014/0085472 A1 * | 3/2014 | Lu ........................... B60R 1/002 348/148 |
| 2014/0160276 A1 | 6/2014 | Pliefke et al. |
| 2014/0188344 A1 * | 7/2014 | Lavoie .................. B60W 30/00 701/41 |
| 2014/0188346 A1 * | 7/2014 | Lavoie .................. B62D 13/06 701/42 |
| 2014/0210456 A1 * | 7/2014 | Crossman ............. B62D 13/06 324/207.2 |
| 2014/0249691 A1 * | 9/2014 | Hafner ................... B62D 13/06 701/1 |
| 2014/0249723 A1 * | 9/2014 | Pilutti .................. B62D 15/027 701/42 |
| 2014/0267688 A1 * | 9/2014 | Aich ..................... H04N 7/181 348/113 |
| 2014/0297128 A1 * | 10/2014 | Lavoie .................. G01B 21/06 701/41 |
| 2014/0297129 A1 * | 10/2014 | Lavoie .................. B62D 13/06 701/41 |
| 2014/0303849 A1 * | 10/2014 | Hafner ................... B62D 13/06 701/42 |
| 2015/0002670 A1 | 1/2015 | Bajpai |
| 2015/0151725 A1 * | 6/2015 | Clarke .................. B60W 30/00 701/28 |
| 2015/0203156 A1 * | 7/2015 | Hafner ................... B62D 13/06 701/36 |
| 2015/0217693 A1 | 8/2015 | Pliefke et al. |
| 2015/0344028 A1 * | 12/2015 | Gieseke ................ B60W 30/00 701/1 |
| 2016/0039456 A1 * | 2/2016 | Lavoie ................ B62D 15/027 701/41 |

* cited by examiner

TRAILER PARKING ASSIST SYSTEM FOR VEHICLE

CROSS REFERENCE TO RELATED APPLICATION

The present application claims the filing benefits of U.S. provisional application Ser. No. 62/206,443, filed Aug. 18, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle to assist a driver of the vehicle in maneuvering the vehicle with a trailer.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

In some systems, when attaching a trailer to the vehicle, the driver has to enter its properties to put the trailer driving aid system into a position to properly calculate the driving aids overlays, when backing up with a trailer attached. Some more advanced systems are able to detect the trailer length and the distance of the trailer's axle to the hatch by watching the trailer's turning behavior when the vehicle and trailer are in motion using visual data processing such as described in U.S. Publication No. US-2014-0160276, which is hereby incorporated herein by reference in its entirety.

Wireless camera data transmission is known, especially Bluetooth® and WLAN. To attach wireless cameras onto vehicles or trailers is also known. Analog image transmission (such as NTSC) to an aftermarket display device installed in the vehicle cabin is common use. In U.S. Publication No. US-2014-0340510, which is hereby incorporated herein by reference in its entirety, the integration of a trailer attached (possibly wireless) camera to an OEM vehicle (possibly top view) vision system is described including the data transmission architecture and the visual human interface. A towing vehicle based trailer stability control is well described in U.S. Publication No. US-2014-0340510.

From German DE 102009057996 (Daimler 2009), it is known how to calibrate a trailer rear-mounted camera relative to a trailing vehicle by visual motion flow analysis via difference image data processing, resulting in a corresponding set of translation and rotation parameters.

In WO 2015/001066, a vehicle trailer back up control system with trailer cameras is disclosed that is able to determine a target route (path plan) with route corridor. Also suggested is 3D representation of the scene. It lacks on describing the according vision processing and camera calibration to do so.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, with the vehicle towing a trailer that includes one or more cameras, and with the system providing enhanced maneuvering of the vehicle and trailer, such as in a reversing direction for parking a trailer.

The present invention provides a vehicle and trailer destination or parking lot determination system having a path planning algorithm and vehicle-trailer train control within a vehicle environment processed by a scene understanding system using environmental sensors and sensor fusion algorithms. The vehicle-trailer train control system utilizes visual trailer identifying and angle detection and processing algorithms. The vehicle-trailer train path planning uses a two stage path planner having a geometric planning with consecutive optimal control minimization algorithm. The environmental scene understanding system uses classifiers for the sensor clustering and input waging with a consecutive classifier based context determination algorithm.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
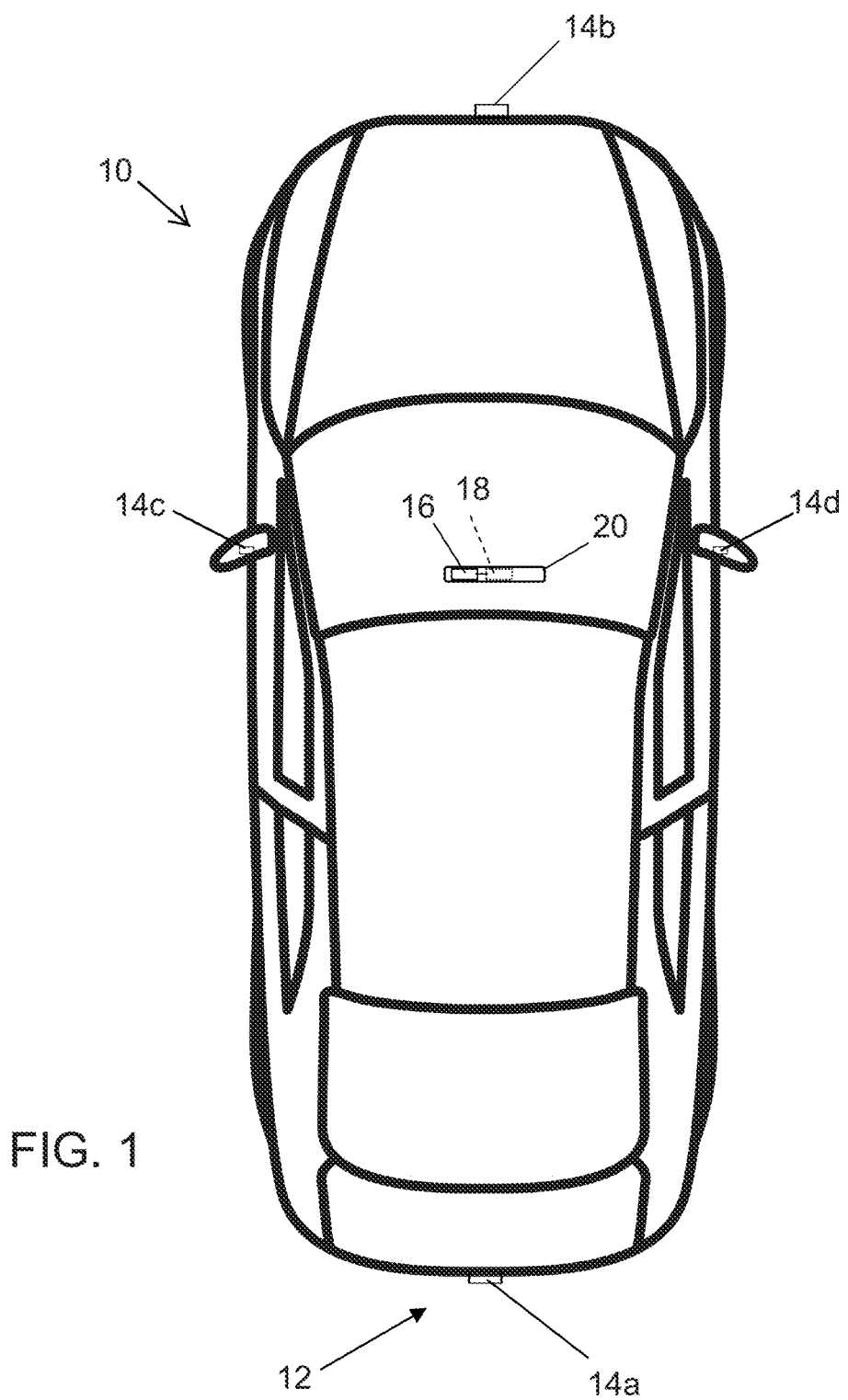
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14*a* (and the system may optionally include multiple exterior facing imaging sensors or cameras, such as a forwardly facing camera 14*b* at the front (or at the windshield) of the vehicle, and a sidewardly/rearwardly facing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a driver assist system that assist the driver in backing up a trailer hooked to the rear of the towing vehicle. The system may utilize aspects of the systems described in U.S. Pat. No. 9,085,261 and/or U.S. Publication Nos. US-2015-0042808; US-2015-0042807; US-2015-0042806; US-2015-0002670; US-2014-0336876; US-2014-0160291; US-2014-0160276 and/or US-2014-0067206, and/or International Publication No. WO 2014/204794, which are hereby incorporated herein by reference in their entireties.

Under use of a trailer camera calibration algorithm similar to such as suggested in DE 102009057996, optionally utilizing methods such as described in U.S. Publication No. US-2014-0160276, one or multiple trailer mounted cameras may be calibratable to the vehicle sensor processing and vision system of the towing (ego-) vehicle's coordinate system, by processing the motion flow visual of the camera or sensor in relation to the motion flow of the vehicle sensor system. The coordinate system may be grid based or may be a vector map or a hybrid with grid maps for the near area and vector based in further distance (such as described in U.S. Publication No. US-2015-0344028, which is hereby incorporated herein by reference in its entirety). As an additional aspect of the invention, the vehicle towed trailer camera or cameras or optional other distance sensor or sensors, such as an ultrasound sensor or ultrasound array sensor, RADAR, Time-of-Flight (TOF) or LIDAR or the like, may be fused to the vehicle environmental map system as additional sensor input fused by the (Baysien, Adaboost or other type) classifier in the same manner as the comparable other sensor inputs to the 'Environment and Object map' of the sensor fusion, such as by utilizing aspects of the systems described in U.S. Publication No. US-2015-0344028. Also similar to U.S. Publication No. US-2015-0344028, the sensor(s) may have a n-1 feedback loop piping in one preceding frame or sensor sample of that same sensor and may have a static input describing the specific sensor properties (at the given point of time n) to the classifier.

Figure 3:
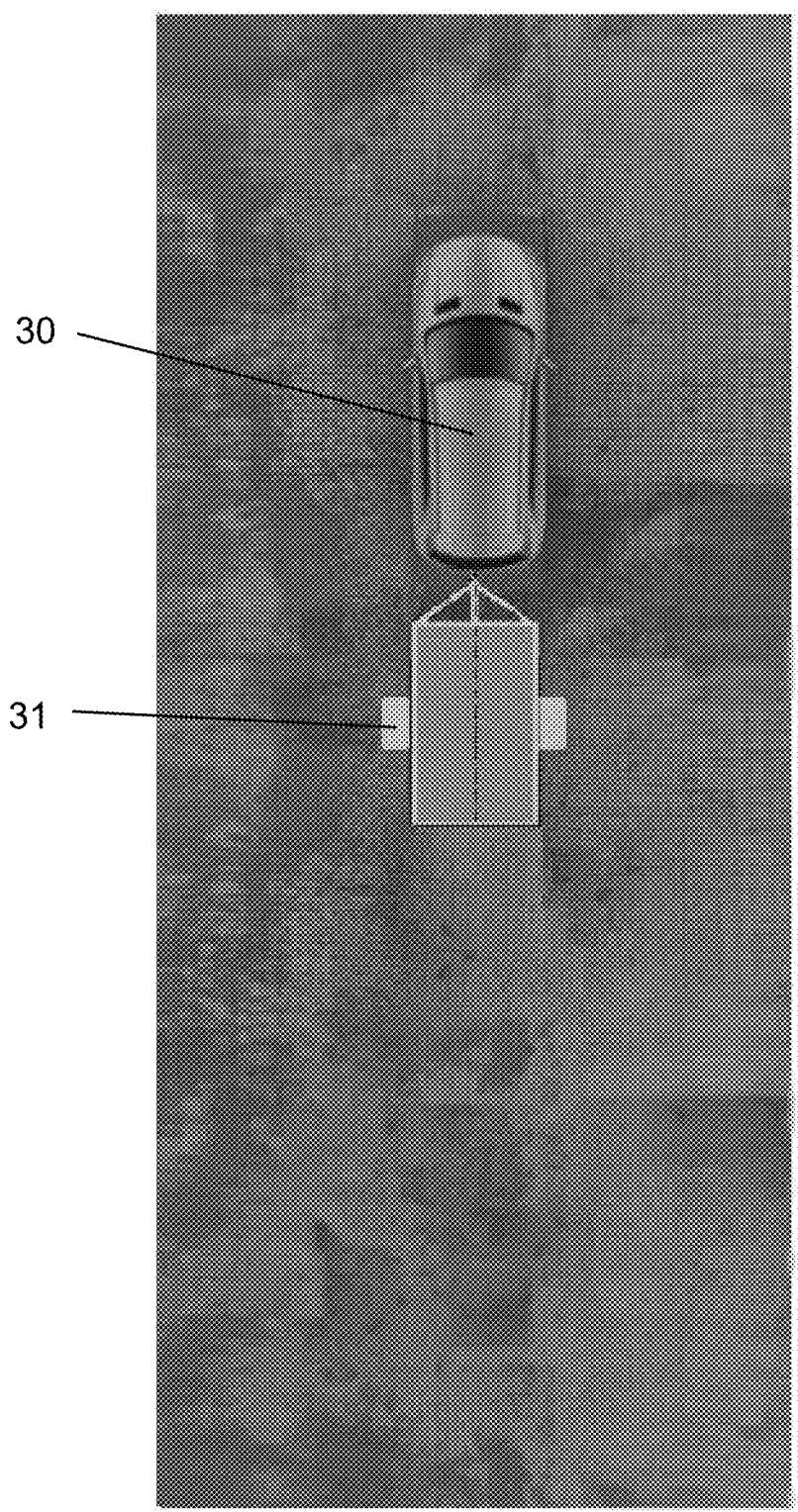
FIG. 3 is a plan view of a vehicle towing a trailer.
Figure 4:
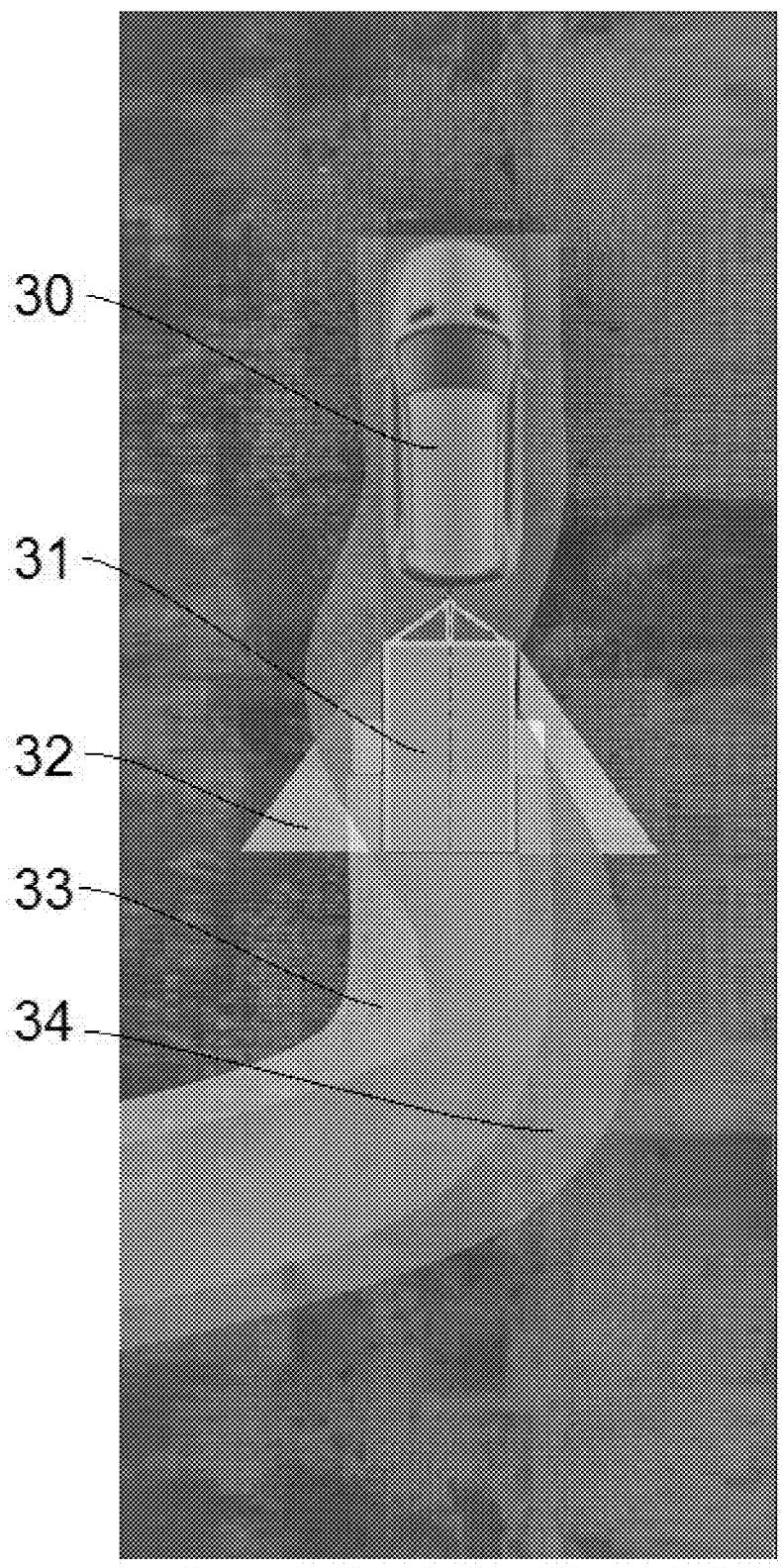
FIG. 4 is a plan view similar to FIG. 3, showing paths of the vehicle and trailer during a rearward turning maneuver.

In accordance with an aspect of the present invention, although areas which are (still) not encompassed by any camera as in the above cited U.S. Publication No. US-2014-0340510 may not be showable on a real time top view generated image, the mapping distance between the trailer camera (or cameras) image(s) and the images captured by the vehicle cameras may be a plausible distance when using a calibrated trailer camera. The mapping may occur in a machine vision system while the human interface may be a top scene view with the ego vehicle and the trailer in it (such as shown in FIGS. 3 and 4). FIG. 3 shows the detected environmental scene with the vehicle overlay 30 of the vehicle and the trailer overlay 31 in it. FIG. 4 shows additionally an overlay of an area inserted to the real time image by historical data (non-real time) content 32, since it is not captured by any sensor or camera. Overlays of a planned vehicle reversing path 34 and the trailer's reversing path 33 are inserted as well. The trailer and the vehicle may be overlays (augmented) having a true scale relative to the augmented vehicle and the real environmental scene, while the environmental scene may be generated non augmented from camera data and optionally other vehicle sensor's data (as discussed as optional under use of the 'Environment and Object map' generation using the sensor processing suggested in U.S. Publication No. US-2015-0344028). Optionally, the areas which are not encompassed by any of the four (or more) surround view vision cameras or trailer camera (or cameras) may be filled by a non-real time image patch out of the earlier detected scene's map system memory for being presented to the driver, such as by using aspects of the systems described in the above cited U.S. Publication No. US-2014-0160276. Optionally, that non-real time scene content (such as the scene area that is not in sensor range or that has a too low confidence level (such as, for example, areas in range of RGB cameras which are in darkness or, for example, ultrasound sensors in front of grass in the sensor range that is waving in the wind)) may be highlighted in any suitable manner, such as partially darkening, applying a blinking or colored overlay or by having blinking boundaries, since the non-real time space may be good for assuming the drivable (static) space but may lead a driver to overlook dynamic scene components such as a person or vehicle which may have stepped or drove into that maneuvering area which may be hazardous for that person, such as can be understood with reference to FIG. 4.

Figure 2:
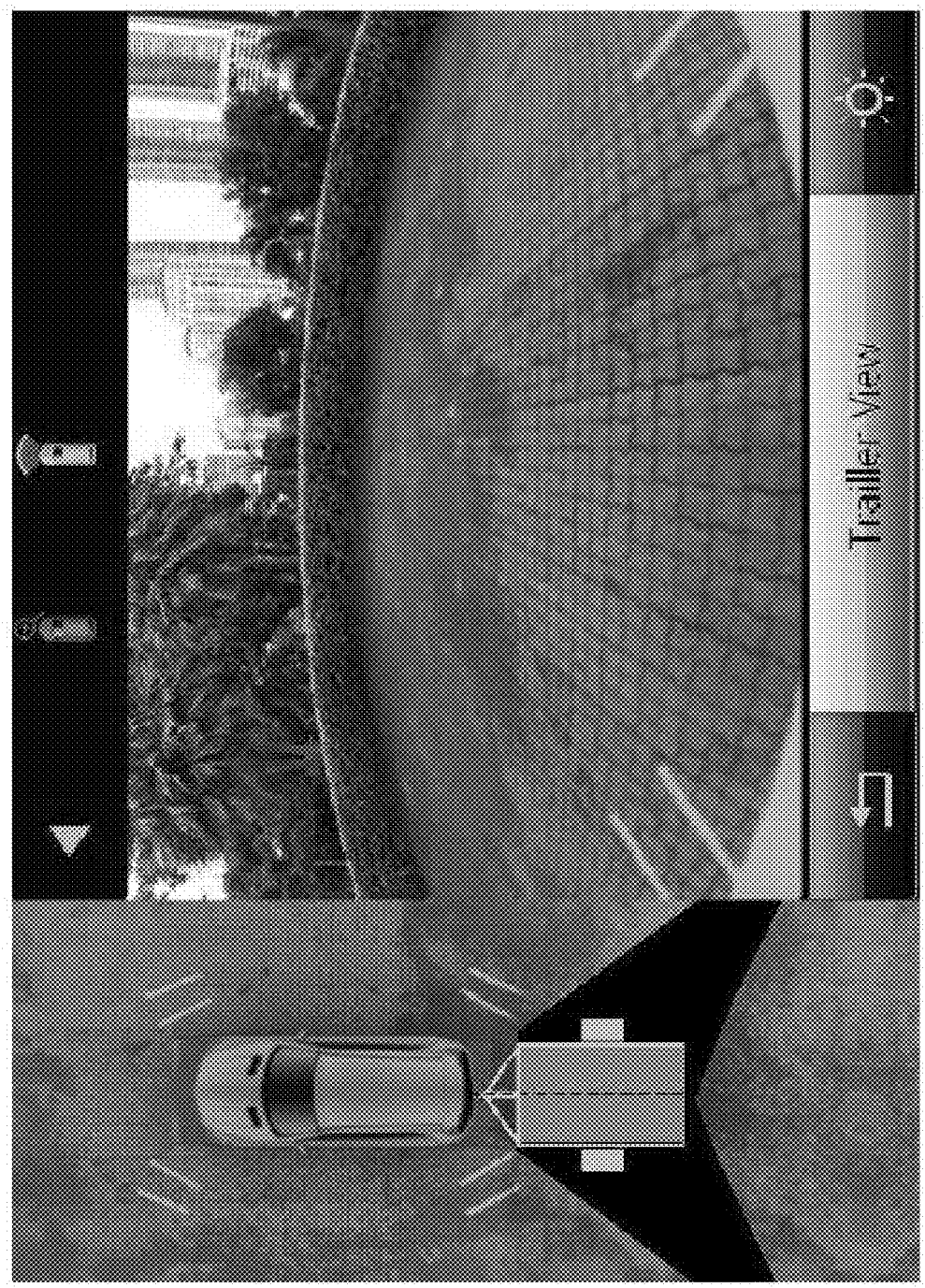
FIG. 2 is an image of a display screen displaying images in accordance with the present invention.

In the customer interface described in U.S. Publication No. US-2014-0340510, and such as shown in FIG. 2 (which corresponds to FIG. 40 of U.S. Publication No. US-2014-0340510), it desirable to have some area between the vehicle rear camera and the trailer camera within the top view image showing voids or black bars in the top view image display mode (with vehicle plus trailer) between the areas encompassed by the vehicle cameras and the area encompassed by the trailer camera since the trailer camera was not calibratable with the vehicle cameras.

Optionally, automated trailer parking or ramp docking DAS may be realized by using an optimal control algorithm under use of a cost minimization function, optionally having a two stage path planner having a first planning stage with a geometrical constructed path planning and a consecutive stage running an optimal control minimization algorithm, which is for smoothing the path and reducing set point extreme values, similar to that suggested in U.S. patent application Ser. No. 15/206,801, filed Jul. 11, 2016, and/or U.S. Publication No. US-2015-0344028, which are hereby incorporated herein by reference in their entireties. Known trailer assistant systems allow the user to navigate a trailer (that is hooked on a propelling or driven vehicle) rearwardly in a curvature controlled manner. In general, trailers behave unstably when being pushed rearwardly. Also, skilled drivers are challenged when backing up vehicle-trailer-trains. Curvature controlling trailer assist systems ease the task by controlling the vehicle's steering wheels in a manner that the trailer is describing a curve in a radius actually set by the user's input, such as described in U.S. Publication No. US-2012-0271515.

It is known that the trailer's path and/or the vehicle's path according to the actual set point is augmented on the vehicle's vision system, such as, for example, via a top view vision system. Since naturally the rear vehicle camera is mostly blocked by the trailer which is being towed by the vehicle, the path to the area the trailer is moving towards is not visible by the vehicle rear camera. To overcome this matter, some OEMs offer the solution that the vehicle vision is transferred to a smart phone and also the vehicle's curvature and longitudinal control is implemented on the smart phone. The user sets the curvature setpoint of the trailer and steers the speed of the vehicle-trailer train. Since the user can exit the vehicle and watch the scene from aside, possibly invisible to any towing vehicle camera, he or she can avoid backing the trailer into a collision or harming someone.

DE 000010128792 discloses a collision avoidance and warning system of drive trains with trailers for maneuvering forward or backwardly. In there it is disclosed that required driving space for the towing vehicle and the trailer all together gets predicted. That system's prediction does not include trajectory planning, the prediction is limited to one circle segment and is based on holding the actual trailer steering angle. The reality is different when maneuvering a trailer forwardly or rearwardly in curves for reaching a specific spot or for avoiding obstacles.

For easier prediction of the last trailer's path of multi-link trains, the curves can be planned in circle segments optionally. In DE 102008043675, a control for controlling the rearward traveling path of multiple links attached to a leading towing vehicle with just the towing vehicle's front wheels controllable was suggested. The control mathematics were more or less poor or not executable in practice since a couple of correction constants were to be determined. Nonholonomic motion path planning of n-trailers by using the Gourset normal form was discussed in IEEE Transactions on Automatik Control, Vol. 40, No. 5, May 1995. Another approach capable to avoid dynamic obstacles was shown by Lamiraux in Springer Path Optimization for Nonholonomic Systems: Application to Reactive Obstacle Avoidance and Path Planning, 2003.

The vehicle-trailer train path planner of the present invention may utilize one of the path planning strategies as described in the above cited references or one similar to the planner and control recently published in International Publication No. WO 2015/001066. International Publication No. WO 2015/001066 though may lack executability by a person skilled in the subject since it does not include any disclosure on how to calibrate the trailer cameras or sensors to the vehicle system so that the control can steer the trailer along a designated path automatically. Without calibration, the scene detection may fail, the path planning, which is depending on a correct scene detection, may fail and the maneuver execution may fail because the path will not match to the real scene, although the path planner itself may work correctly (but using wrong input data).

Departing from the prior art, including International Publication No. WO 2015/001066, the system of the present invention uses the trailer camera not just to determine that the trailer is approaching possibly hazardous objects but to assimilate the visual scene information to the vehicle's scene sensor processing (master-) system. The trailer cameras are calibrated essentially by motion flow (such as to correct for improper installation, such as being tilted, rolled or yawed or being off center), such as similar to the calibration of the surround vision system's fish eye cameras (14a, 14b, 14c and 14d) attached to the (towing) vehicle such as shown in FIG. 1. The calibration may require the vehicle-trailer train to be in motion, for having motion flow. The scenery may require some texture or pattern so that the system has some fix points to track and motion assess. The texture or pattern should be naturally given when the train is driven in natural environment (such as given by trees, buildings, vehicles, and/or the like in the environment surrounding the vehicle and trailer). The initial test drive for initializing the trailer camera in coordinates to the tow vehicle born coordinate (map-) system may be comparably short, such as about 10 m or thereabouts. The additionally required trailer angle detection system may be (towing-) vehicle rear camera based or vehicle rear end ultrasound sensor (possibly ultrasound sensor array) based or may be another direct mounted angle sensor based or contactless sensor based system capable of detecting the trailer angle against the towing vehicle, optionally having a dedicated target (sticker) on the trailer to enable the trailer angle detection system to function, or optionally targetless trailer detection may be incorporated in the automated trailer path control system of the present invention.

Optionally, the trailer path control system of the present invention may additionally be capable of avoiding hazards with dynamic objects such as pedestrians walking through the pursued trailer destination or parking spot or the path to it. The system's algorithm may have a threshold time which alters the classification of a moving object to a static object when it comes to a stop over a certain time (such as, for example, when another vehicle within the environmental scene [map] stops). While the system may just wait until a moving object, such as, for example, a pedestrian or the like, has left the trailer train destination path, the system may optionally redo the path planning in case the static map has changed, such as when another vehicle has occupied (and stopped) a part of the free space that was part of the destination path originally.

The system may utilize aspects of the trailering or trailer angle detection systems described in U.S. Pat. Nos. 9,086, 261 and/or 6,690,268, and/or U.S. Publication Nos. US-2015-0217693; US-2014-0160276; US-2014-0085472 and/or US-2015-0002670, and/or U.S. provisional applications, Ser. No. 62/303,546, filed Mar. 4, 2016, and/or Ser. No. 62/290,167, filed Feb. 2, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0211009;2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array imaging sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:
1. A driver assist system for a vehicle, said driver assist system comprising:

a plurality of vehicle cameras configured to be disposed at a vehicle and having respective fields of view exterior of the vehicle;
at least one trailer camera configured to be disposed at a trailer towed by the vehicle;
an image processor operable to process image data captured by said plurality of vehicle cameras and by said at least one trailer camera;
wherein, with said plurality of vehicle cameras disposed at the vehicle and with said at least one trailer camera disposed at the trailer towed by the vehicle, and responsive to processing of image data captured by said plurality of vehicle cameras and by said at least one trailer camera during forward or rearward motion of the vehicle towing the trailer, said driver assist system calibrates said at least one trailer camera to be in accordance with calibration of said plurality of vehicle cameras;
wherein, responsive to processing of image data captured by said plurality of vehicle cameras and by said at least one trailer camera during forward or rearward motion of the vehicle towing the trailer, said driver assist system determines objects rearward of the trailer that are present in the field of view of said at least one trailer camera and not present in the fields of view of said plurality of vehicle cameras;
a display screen disposed in the vehicle for viewing by a driver of the vehicle, and wherein said display screen displays video images derived from image data captured by at least one camera selected from the group consisting of said plurality of vehicle cameras and said at least one trailer camera;
wherein said driver assist system generates graphic overlays at said display screen overlaying the displayed video images, the graphic overlays indicating a projected path of the vehicle towing the trailer for maneuvering the vehicle and trailer towards a target parking space; and
wherein, during a reversing maneuver, and responsive to a determination of an object rearward of the trailer, said driver assist system adjusts the projected path to avoid the object.

2. The driver assist system of claim 1, wherein, responsive to processing of image data captured by said plurality of vehicle cameras and by said at least one trailer camera during forward or rearward motion of the vehicle towing the trailer, said driver assist system initializes said at least one trailer camera in coordinates that correspond to coordinates of said plurality of vehicle cameras.

3. The driver assist system of claim 1, wherein said driver assist system calibrates said at least one trailer camera in accordance with said plurality of vehicle cameras responsive at least in part to a determination of a trailer angle of the trailer relative to the vehicle.

4. The driver assist system of claim 3, wherein said driver assist system determines the trailer angle responsive at least in part to image processing of image data captured by said plurality of vehicle cameras and by said at least one trailer camera.

5. The driver assist system of claim 1, wherein, responsive to determination of an object rearward of the trailer, said driver assist system at least one of (i) generates an alert to the driver of the vehicle, (ii) controls a braking system of the vehicle and (iii) controls a steering system of the vehicle.

6. The driver assist system of claim 1, wherein said driver assist system utilizes a trailer identifying and angle detection algorithm.

7. The driver assist system of claim 1, wherein said driver assist system uses a two stage path planner having a geometric planning with consecutive optimal control minimization algorithm.

8. A driver assist system for a vehicle, said driver assist system comprising:
a plurality of vehicle cameras configured to be disposed at a vehicle and having respective fields of view exterior of the vehicle;
at least one trailer camera configured to be disposed at a trailer towed by the vehicle;
an image processor operable to process image data captured by said plurality of vehicle cameras and by said at least one trailer camera;
wherein, with said plurality of vehicle cameras disposed at the vehicle and with said at least one trailer camera disposed at the trailer towed by the vehicle, and responsive to processing of image data captured by said plurality of vehicle cameras and by said at least one trailer camera during forward or rearward motion of the vehicle towing the trailer, said driver assist system calibrates said at least one trailer camera to be in accordance with calibration of said plurality of vehicle cameras;
wherein, responsive to processing of image data captured by said plurality of vehicle cameras and by said at least one trailer camera during forward or rearward motion of the vehicle towing the trailer, said driver assist system initializes said at least one trailer camera in coordinates that correspond to coordinates of said plurality of vehicle cameras;
wherein, responsive to processing of image data captured by said plurality of vehicle cameras and by said at least one trailer camera during forward or rearward motion of the vehicle towing the trailer, said driver assist system determines objects rearward of the trailer that are present in the field of view of said at least one trailer camera and not present in the fields of view of said plurality of vehicle cameras;
a display screen disposed in the vehicle for viewing by a driver of the vehicle, and wherein said display screen displays video images derived from image data captured by at least one camera selected from the group consisting of said plurality of vehicle cameras and said at least one trailer camera; and
wherein the displayed video images include patched image portions derived from previously captured frames of image data to fill in areas in the displayed video images that were previously encompassed by a field of view of at least one of said plurality cameras and said at least one trailer camera and that are not presently encompassed by the fields of view of any of said plurality of vehicle cameras and said at least one trailer camera.

9. The driver assist system of claim 8, wherein said driver assist system generates graphic overlays at said display screen overlaying the displayed video images, the graphic overlays indicating a projected path of the vehicle and trailer for maneuvering the vehicle towing the trailer towards a target parking space, and wherein, during a reversing maneuver, and responsive to a determination of an object rearward of the trailer, said driver assist system adjusts the projected path to avoid the object.

10. The driver assist system of claim 8, wherein said driver assist system calibrates said at least one trailer camera to be in accordance with calibration of said plurality of vehicle cameras responsive at least in part to a determination of a trailer angle of the trailer relative to the vehicle, and wherein said driver assist system determines the trailer angle responsive at least in part to image processing of image data captured by said plurality of vehicle cameras and by said at least one trailer camera.

11. The driver assist system of claim 8, wherein, responsive to a determination of an object rearward of the trailer, said driver assist system at least one of (i) generates an alert to the driver of the vehicle, (ii) controls a braking system of the vehicle and (iii) controls a steering system of the vehicle.

12. The driver assist system of claim 8, wherein said driver assist system utilizes a trailer identifying and angle detection algorithm.

13. The driver assist system of claim 8, wherein said driver assist system highlights the patched image portions of the displayed images to alert the driver that those areas are not encompassed by the field of view of any of said plurality of vehicle cameras and said at least one trailer camera.

14. A driver assist system for a vehicle, said driver assist system comprising:
- a plurality of vehicle cameras configured to be disposed at a vehicle and having respective fields of view exterior of the vehicle;
- at least one trailer camera configured to be disposed at a trailer towed by the vehicle;
- an image processor operable to process image data captured by said plurality of vehicle cameras and said at least one trailer camera;
- wherein, with said plurality of vehicle cameras disposed at the vehicle and said at least one trailer camera disposed at the trailer towed by the vehicle, and responsive to processing of image data captured by said plurality of vehicle cameras and by said at least one trailer camera during forward or rearward motion of the vehicle towing the trailer, said driver assist system calibrates said at least one trailer camera to be in accordance with calibration of said plurality of vehicle cameras;
- wherein, responsive to processing of image data captured by said plurality of vehicle cameras and by said at least one trailer camera during forward or rearward motion of the vehicle towing the trailer, said driver assist system determines objects rearward of the trailer that are present in the field of view of said at least one trailer camera and not present in the fields of view of said plurality of vehicle cameras;
- a display screen disposed in the vehicle for viewing by a driver of the vehicle, wherein said display screen displays video images derived from image data captured by at least one camera selected from the group consisting of said plurality of vehicle cameras and said at least one trailer camera;
- wherein said driver assist system generates graphic overlays at said display screen overlaying the displayed video images, the graphic overlays indicating a projected path of the vehicle towing the trailer for maneuvering the vehicle and trailer towards a target parking space;
- wherein, during a reversing maneuver, and responsive to a determination of an object rearward of the trailer via processing by said image processor of image data captured by said plurality of vehicle cameras and by said at least one trailer camera, said driver assist system adjusts the projected path to avoid the object; and
- wherein, responsive to a determination of the object rearward of the trailer via processing by said image processor of image data captured by said plurality of vehicle cameras and by said at least one trailer camera, said driver assist system at least one of (i) generates an alert to the driver of the vehicle, (ii) controls a braking system of the vehicle and (iii) controls a steering system of the vehicle.

15. The driver assist system of claim 14, wherein, responsive to processing of image data captured by said plurality of vehicle cameras and by said at least one trailer camera during forward or rearward motion of the vehicle towing the trailer, said driver assist system initializes said at least one trailer camera in coordinates that correspond to coordinates of said plurality of vehicle cameras.

16. The driver assist system of claim 14, wherein said driver assist system calibrates said at least one trailer camera in accordance with said plurality of vehicle cameras responsive at least in part to a determination of a trailer angle of the trailer relative to the vehicle, and wherein said driver assist system determines the trailer angle responsive at least in part to image processing of image data captured by said plurality of vehicle cameras and by said at least one trailer camera.

17. The driver assist system of claim 14, wherein said driver assist system utilizes a trailer identifying and angle detection algorithm, and wherein said driver assist system uses a two stage path planner having a geometric planning with consecutive optimal control minimization algorithm.

* * * * *